United States Patent
Kilibarda

(10) Patent No.: US 9,513,625 B2
(45) Date of Patent: Dec. 6, 2016

(54) INTEGRATED VEHICLE PART DELIVERY AND BUILD SYSTEM

(75) Inventor: Velibor Kilibarda, West Bloomfield, MI (US)

(73) Assignee: Comau LLC, Southfield, MI (US)

( * ) Notice: Subject to any disclaimer, the term of this patent is extended or adjusted under 35 U.S.C. 154(b) by 1086 days.

(21) Appl. No.: 13/483,156

(22) Filed: May 30, 2012

(65) Prior Publication Data

US 2012/0304446 A1 Dec. 6, 2012

Related U.S. Application Data

(60) Provisional application No. 61/493,032, filed on Jun. 3, 2011.

(51) Int. Cl.
*G05B 19/418* (2006.01)
*B23P 21/00* (2006.01)

(52) U.S. Cl.
CPC ....... *G05B 19/41805* (2013.01); *B23P 21/004* (2013.01); *B23P 2700/50* (2013.01); *G05B 2219/31036* (2013.01); *G05B 2219/31044* (2013.01); *Y02P 90/04* (2015.11); *Y02P 90/16* (2015.11); *Y02P 90/185* (2015.11); *Y10T 29/49829* (2015.01); *Y10T 29/534* (2015.01); *Y10T 29/53417* (2015.01)

(58) Field of Classification Search
CPC .............. G05B 19/41805; G05B 2219/31036; G05B 2219/31044; B23P 21/004; B23P 2700/50; Y10T 29/53417; Y10T 29/49829; Y10T 29/534
See application file for complete search history.

(56) References Cited

U.S. PATENT DOCUMENTS 5,123,148 A * 6/1992 Ikeda .................... B23P 19/02
29/11
5,347,700 A * 9/1994 Tominaga ............ B23P 21/004
228/101

(Continued)

FOREIGN PATENT DOCUMENTS

DE 102004057664 A1 6/2006
DE 102005062691 A1 7/2007

(Continued)

OTHER PUBLICATIONS

Notification of Transmittal, International Search Report and Written Opinion of the International Searching Authority dated Sep. 10, 2012 from the corresponding International Application No. PCT/US2012/039952, filed May 30, 2012.

(Continued)

*Primary Examiner* — Richard Chang
(74) *Attorney, Agent, or Firm* — Young Basile Hanlon & MacFarlane, P.C.

(57) ABSTRACT

A device and method for assembling parts, products or machines in a random build order that integrates or combines the delivery of loose components to be assembled on a carriage that itself supports the device being assembled along an assembly line path of travel. The loose parts onboard the carriage that also supports the device being progressively assembled substantially improves the logistics in an assembly plant and efficiency in building the part, product or device, for example a vehicle sheet metal body.

14 Claims, 13 Drawing Sheets

(56) References Cited

U.S. PATENT DOCUMENTS

| | | |
|---|---|---|
| 6,564,440 B2 | 5/2003 | Oldford |
| 6,719,122 B2 | 4/2004 | Oldford |
| 6,799,673 B2 | 10/2004 | Kilabarda |
| 6,813,539 B2 | 11/2004 | Morimoto et al. |
| 6,966,427 B2 | 11/2005 | Kilibarda |
| 7,108,189 B2 | 9/2006 | Kilibarda |
| 2002/0087226 A1 | 7/2002 | Boudreau |
| 2002/0103569 A1 | 8/2002 | Mazur |
| 2003/0115746 A1 | 6/2003 | Saito et al. |
| 2004/0055129 A1 | 3/2004 | Ghuman |
| 2005/0025612 A1 | 2/2005 | Ehrenleitner |
| 2005/0044700 A1 | 3/2005 | Ghuman et al. |
| 2008/0181753 A1* | 7/2008 | Bastian ................ B65G 1/026 414/277 |
| 2009/0234488 A1 | 9/2009 | Kilibarda |
| 2010/0241260 A1 | 9/2010 | Kilibarda |

FOREIGN PATENT DOCUMENTS

| | | |
|---|---|---|
| EP | 1298043 A2 | 4/2003 |
| EP | 1362663 A2 | 11/2003 |
| EP | 1426275 A1 | 6/2004 |
| JP | 10101222 A | 4/1998 |
| WO | 2007077056 A1 | 7/2007 |

OTHER PUBLICATIONS

Notification of Transmittal, International Search Report and Written Opinion of the International Searching Authority dated Aug. 29, 2011 from the corresponding International Application No. PCT/US2011/039097 filed Jun. 3, 2011.

International Search Report in related matter PCT/US2015/065588, dated May 19, 2016, 25 pages.

* cited by examiner

INTEGRATED VEHICLE PART DELIVERY AND BUILD SYSTEM

CROSS-REFERENCE TO RELATED-APPLICATION

This application claims priority benefit to U.S. Provisional Patent Application Ser. No. 61/493,032, filed Jun. 3, 2011 which is incorporated by reference in its entirety.

TECHNICAL FIELD

The present invention generally relates to the field of vehicle manufacture and assembly.

BACKGROUND

Traditional high volume manufacture and assembly of machines and vehicles has occurred in large assembly plants. These assembly plants have included multiple assembly lines where components are gathered, assembled and connected together. In the manufacture and assembly of vehicular bodies, the bodies typically include a skeleton of sheet metal components that are welded together through resistance spot welding, seam welding and brazing techniques to form what are commonly called "body-in-white" (BIW) structures.

With the growing need to efficiently build vehicles and accommodate varying consumer demand, assembly plants have strived to employ flexible build processes so that different vehicles, or vehicle bodies, can be built along the same assembly lines. The ability to quickly change over from building one type of body to another causes significant difficulty for facilities due to the limited amount of space around assembly lines and the time required to change over equipment and components that are specific to one vehicle body.

Due to these difficulties in logistics and time, manufacturers have employed either batch-type vehicle builds where a certain number of one vehicle body is assembled before changing the equipment and components so a different vehicle body can be assembled. In order to accomplish this, bins or racks containing many individual components or subassemblies specific to a particular vehicle were positioned next to an assembly cell or build station along the assembly line. If, for example, different vehicle body types or styles A, B and C were to be built, bins for storing or staging components for a build cell specific to a vehicle body would have to be positioned proximate to the build station. On changing from one vehicle type to another, for example for vehicle type A to vehicle type B, the bin A would have to be moved aside so the bin containing the B vehicle-type components could be positioned next to the assembly cell for convenient transfer by hand or automated robot. Where three, four or more different vehicles types are built along an assembly line, it is problematic and burdensome to logistically keep many bins of different parts next to each assembly cell. This causes congestion on the plant floor and further complicates the changeover process.

Alternately, and in a further effort to meet varying consumer demand, vehicle builds were conducted in a random build sequence where every next vehicle to be built was different than the one prior. Such random build sequences required coordinating the sequencing of build parts in a particular part rack to match the selected vehicle build sequence. For example, if a body type A was to be built followed by a body type B, then C, an individual bin at an assembly cell would include parts A, B and C organized or staged in the bin in the specific order the vehicles were to be built. This required significant planning, coordination and staging of the parts in the individual bins prior to delivery to the assembly line and careful selection of the parts from the bin on the assembly line to ensure the proper vehicle specific part was removed from the bin and used in the assembly cell. Such coordination and staging was time consuming, costly and susceptible to a high occurrence of error.

Thus there is a need to improve on the system for efficiently achieving the desired random build sequence that reduces or eliminates the above difficulties and problems.

BRIEF SUMMARY

The present invention includes a system for sequenced part delivery using an integral device and method which provides the advantages of sequenced part delivery to support a random vehicle-type build process. The present invention provides sequenced, vehicle-specific components and subassemblies along the path that the vehicle body is progressively built, not in part bins, kits or moveable carts along side of the assembly line like prior systems.

In one example of the system and method, a carriage is used to support and transport both the loose build components and subassemblies as well as the partially assembled device being constructed through a plurality of build stations positioned along an assembly line. The components are selectively removed from part racks on the carriage and assembled to the progressively built product without the need for separate conveyors, part bins adjacent the build stations greatly increasing efficiency and assembly plant logistics.

In one example, the carriage includes a deck portion which supports the product being assembled and two part racks which support the build components. The deck portion selectively moves relative to the part racks so that in a particular build station, the deck portion with the onboard product being assembled can be precisely positioned on a fixture for processing in the build station. On completion of the assembly operations, the deck portion is re-engaged with the part racks and the carriage is transported to the next build station for additional processing.

The present invention allows increased flexibility in the manufacture and assembly of, for example, vehicle body structures regardless of the vehicle architecture or body style and the sequence that the vehicle bodies are to be built. The present invention further greatly simplifies the assembly plant floor in the area of the assembly lines making for a more efficient and logistically compact assembly plant.

BRIEF DESCRIPTION OF THE DRAWINGS

The description herein makes reference to the accompanying drawings wherein like reference numerals refer to like parts throughout the several views, and wherein.

DETAILED DESCRIPTION OF EMBODIMENTS OF THE INVENTION

Referring to FIGS. 1-12 an integrated vehicle part delivery and build apparatus and method for sequenced, vehicle-specific part delivery and assembly is illustrated and examples explained below.

Figure 1:
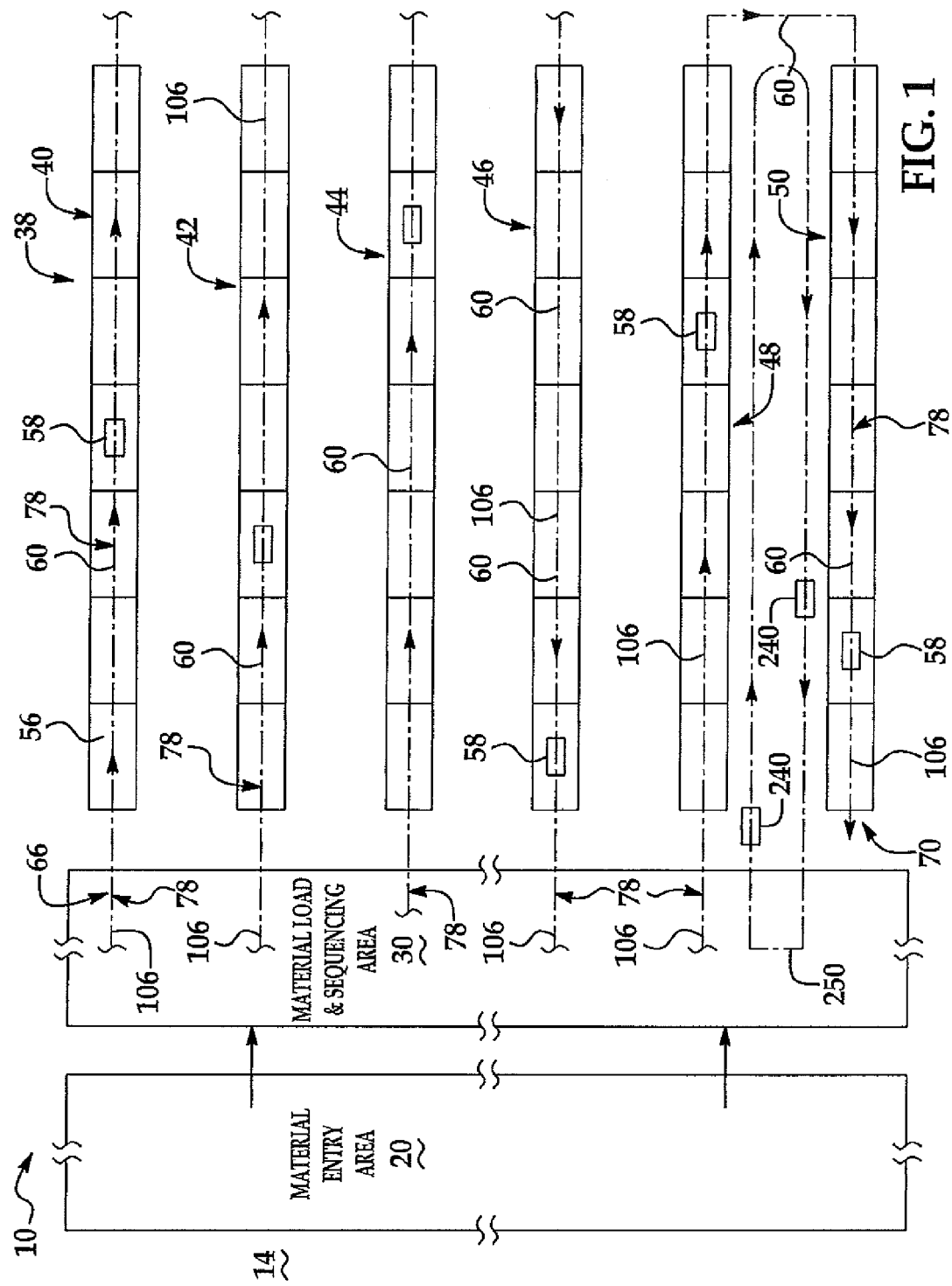
FIG. 1 is a schematic of an example of a six assembly line layout for a vehicle assembly plant.

Referring to FIG. 1, an example of a integrated vehicle part delivery and build system 10 useful on an example of assembly plant floor 14 for body-in-white (BIW) vehicle body structures 58 is shown. In the example, the system 10 includes a material entry area 20, a material loading and sequencing or staging area 30, and a plurality of main assembly lines 38 (six shown in FIG. 1 and identified as 40-50 as illustrated). Each assembly line 38 includes a vehicle travel path 60 running down each line 40-50.

Referring to the example in FIG. 1, simplified for purposes of illustration, there is an assembly line starting position 66 and an ending position 70 with vehicle body build path 60. In the example shown, each individual assembly line 40, 42, 44 and 46 have an independent vehicle build path 60 beginning in the material sequencing area 30 and ending at the opposite end of the line for simplicity purposes of illustration only. Exemplary lines 48 and 50 illustrate a loop or serpentine path 60 beginning with line 48 in area 30 and ending at 70. It is understood that lines 48 and 50 may be independent like lines 40-46 or additional or all lines may form a continuous serpentine path as known by those skilled in the art. In a preferred example, multiple assembly lines begin in area 30 as further explained below. Other configurations and plant layouts known by those skilled in the art may be used with the present invention.

In one example, material entry area 20 is a large area in the assembly plant 14 used for the warehousing and organization of individual vehicle sheet metal or BIW components or subassemblies of components 139 (not shown) which are to be assembled and connected together at selected assembly cells or build stations 56 (seven stations for each line 38 shown in FIG. 2 for ease of illustration only) at the assembly lines 38 to produce a product, for example, an automotive vehicle sheet metal body-in-white (BIW) 58. It is contemplated that many different components and subassemblies for different vehicle body types, for example different vehicle body types or styles A, B and C, are input, organized and stored in area 20 until needed for production build of the vehicle body 58. The material entry area 20 has suitable ingress and egress points to easily move large quantities of components and subassemblies into and out of the area 20 as needed. Other features such as storage racks and other logistical, inventory and organizational features known by those skilled in the art may be used. It is understood that more or less assembly lines and assembly cells per line may be used as known by those skilled in the art.

Figure 2:
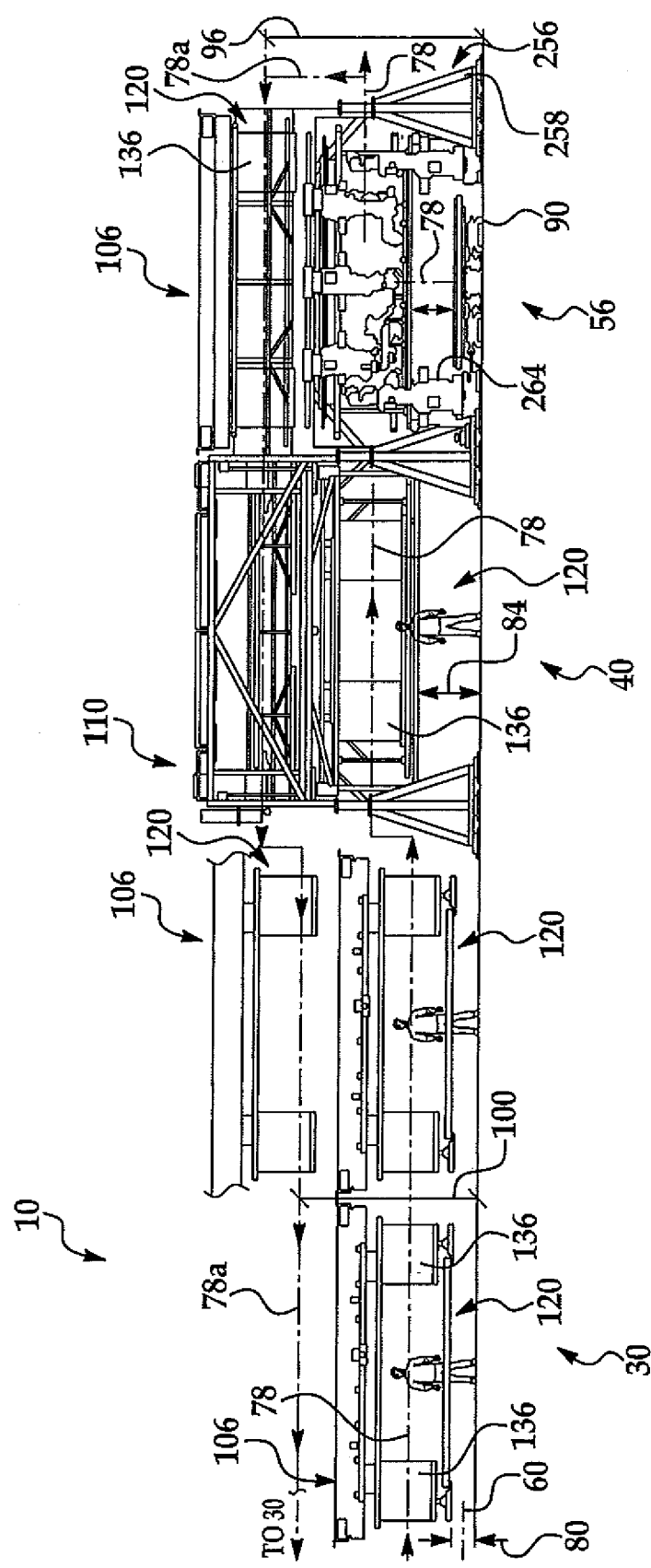
FIG. 2 is a schematic elevational view of an example of the inventive apparatus and method.
Figure 3:
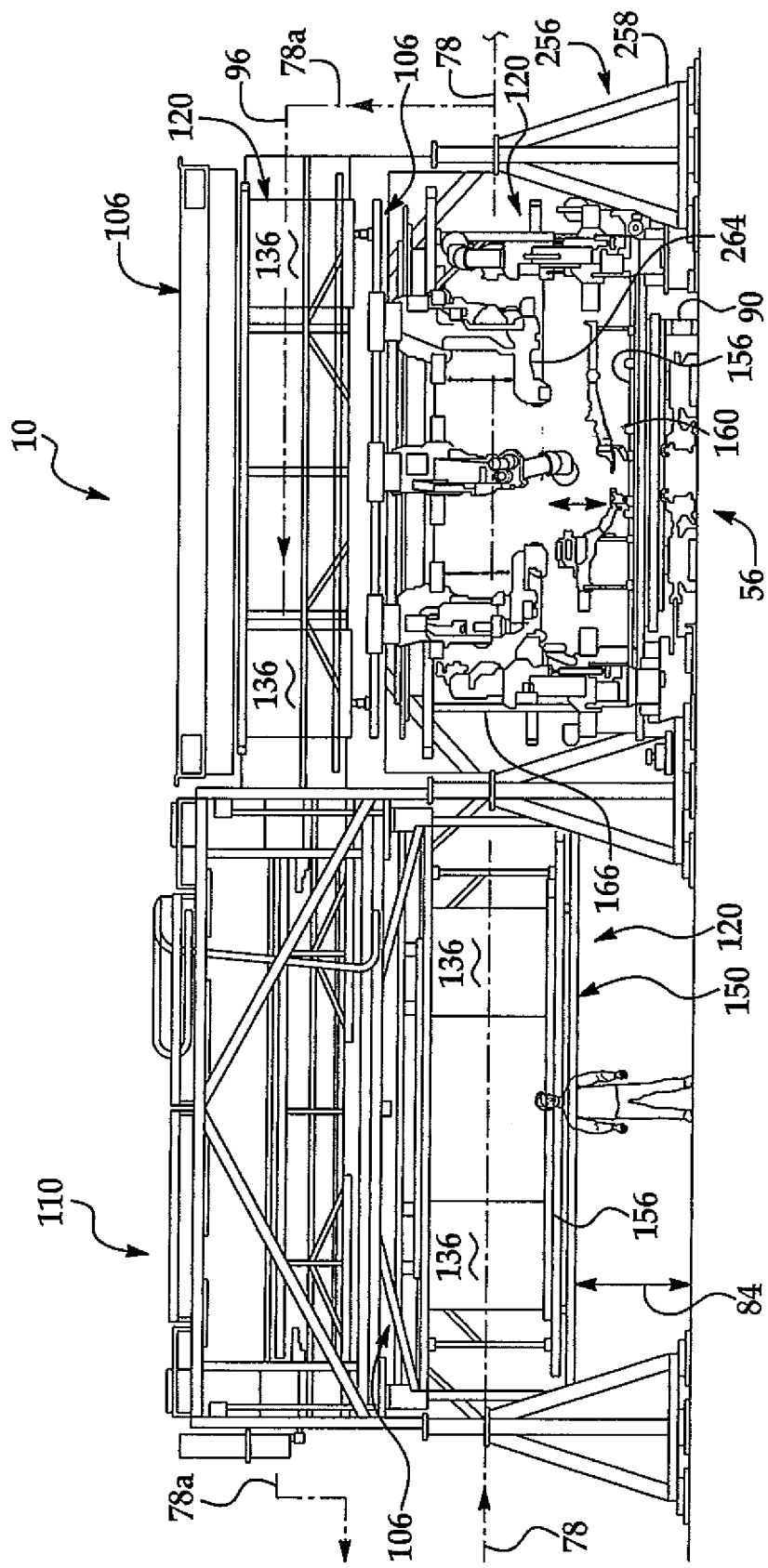
FIG. 3 is an enlarged, partial view of the example shown in FIG. 2.

Referring to FIGS. 2 and 3, an example of the invention 10 part transport and delivery system is generally illustrated. In a summarized preferred example, the invention 10 provides for the coordinated and sequenced delivery of vehicle-specific build components on individual carriers through an assembly line using the same transport device providing an integrated delivery and build system. In addition, through the transport device, the invention provides the delivery of the build components in a build position in each assembly cell eliminating peripheral delivery and assembly cell logistics problems common in prior designs.

In the example of invention 10, a component and subassembly path of travel 78 is shown. As further seen in FIG. 1, component path 78 is substantially aligned along/over the vehicle body travel path 60. Component path 78 begins in the material sequencing area 30 and extends into the production and main assembly area 40. As explained in more detail below, a plurality of individual component carriages 120 are sequentially loaded with individual components and/or subassemblies in material sequencing area 30 where the carriages are positioned at a first or load stage height 80 where workers (shown) or industrial multi-axis robots (not shown) sequentially load the carriages with vehicle-specific parts particular to a certain vehicle body style, for example body style A and B.

Figure 4:
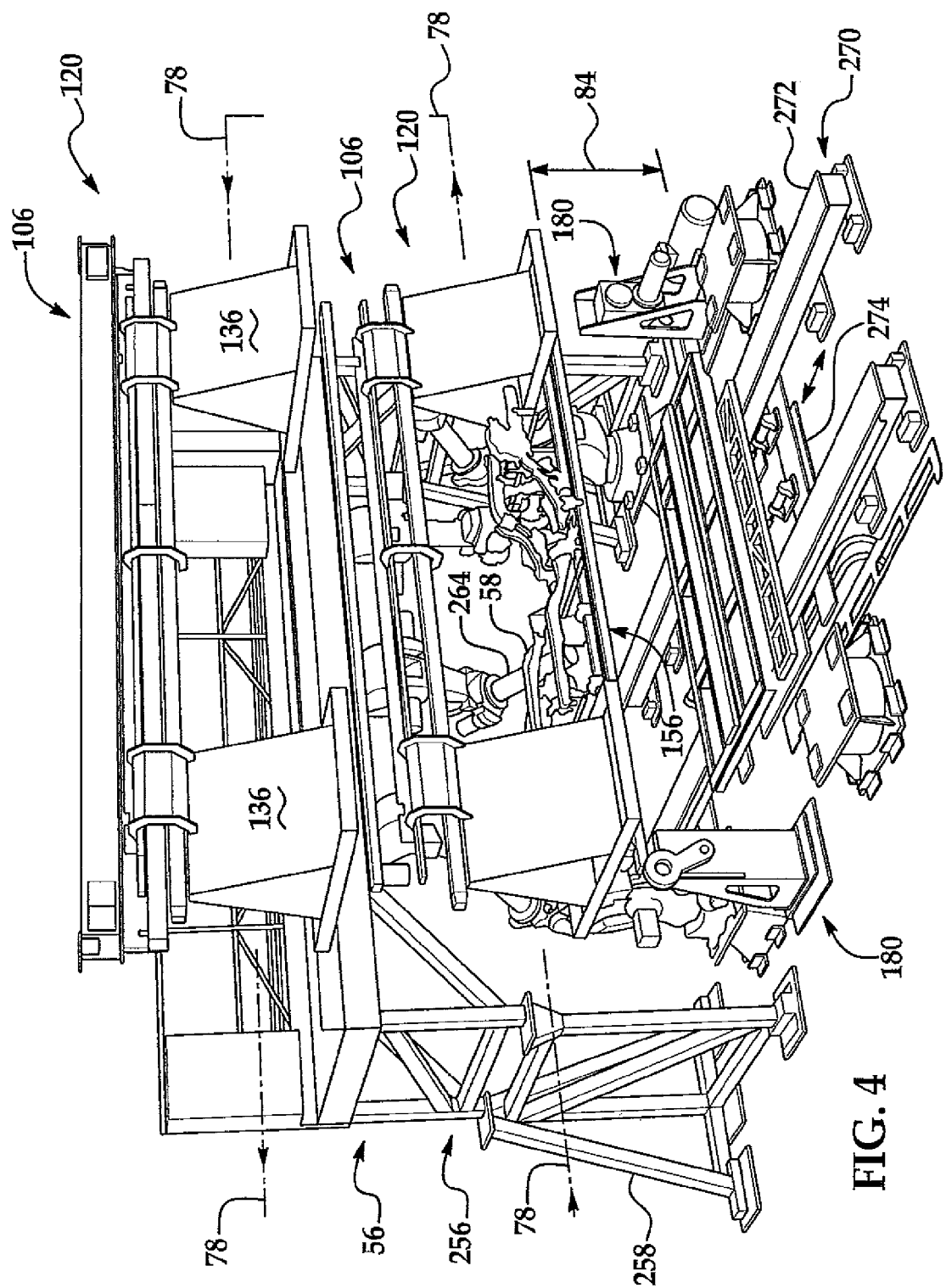
FIG. 4 is a schematic perspective view of the invention at an assembly cell.

As best seen in FIGS. 3 and 4, the carriages 120 are connected to and powered along the path of travel 78 preferably by the same overhead conveyor 106 used throughout the loading and building process discussed in detail below. On nearing an assembly cell 56, an elevator device 110 raises the carriage 120 and supported components to a second or cell load height 84 and then transferred into the assembly cell 56 and in engagement with a deck lift device 180 discussed in further detail below. The lift device 180 supports and permits a deck portion 156 of the carriage 120 to lower into a third or cell build height position 90 where industrial robots 264 can conduct assembly operations, for example resistance spot welding, to progressively assemble the vehicle body 58. In this position, additional components and subassemblies positioned on the carriage 120 can be easily accessed, engaged and moved into position by the robots 264 for processing with the vehicle body 58.

On completion of the predetermined assembly operations in the assembly cell 56, the deck lift device 180 actuates and raises the carriage deck 156 back to the cell load height 84 and re-engages the deck 156 to the suspended carriage 120. On satisfaction of safety checks and controls (not shown), the conveyor 106 moves the carriage 120 and progressively built vehicle body 56 along path 78 to the next sequential assembly cell 56 positioned along the assembly line.

As shown in the example in FIGS. 2 and 3, at the end of a particular assembly line, for example 40, when the pre-loaded components and subassemblies on carriage 120 are all used or installed on body 58, the completed assembly 58 is removed from the carriage and the empty carriage 120 is elevated along path 78a by a second elevator (not shown) to a high return or fourth height 96 as best seen in FIG. 3. The empty carriage then reverses direction back toward material sequencing area 30 for reloading of parts and reinsertion into the assembly line for another vehicle. In a preferred example, on the return path 78a, carriage 120 is lowered to a fifth or lower return height 100 through an elevator device (not shown) to complete travel back to sequencing area 30 and reloading and reinsertion into the predetermined assembly sequence. Throughout the above-described path, the carriages 120 preferably use the same transport system 106 providing for a coordinated, controlled and integrated process for part loading, part delivery, vehicle build and return for resequencing.

Alternately, for example if the carriage 120 still has parts to be installed on vehicle body 58, the carriage passes to the next assembly cell or other area of the assembly plant for further build and processing. Further, to suit the logistics of the assembly plant or efficiencies of the overall assembly process, the above-described process can be reversed whereby the carriage 120 is loaded in area 30 but first travels to the far end of the assembly line above the assembly cells at heights 96 and/or 100 and then down and back through assembly cells 56 toward area 30.

Figure 11:
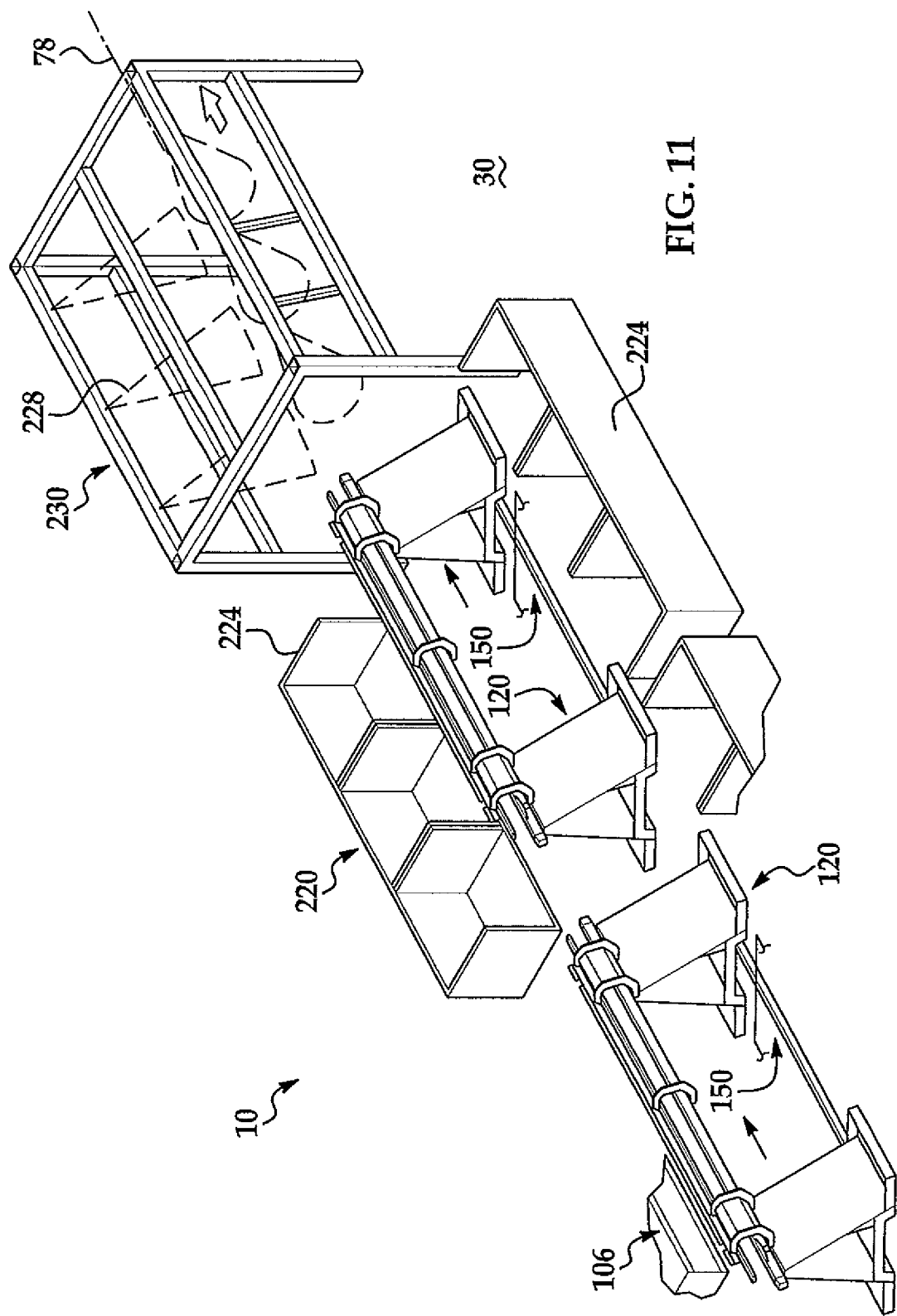
FIG. 11 is a partial schematic perspective view of an example of the invention where exemplary, partially illustrated carriages are being loaded with components in a material sequencing area.

Referring to FIGS. 1 and 11, an example of system 10 includes process steps in a material sequencing, staging and loading area 30. In a preferred example, this is a large area in the assembly plant 14 positioned adjacent to the material entry area 20. Sequencing area 30 is structured so that individual components or partially assembled subassemblies can be transferred from material entry area 20 to sequencing area 30, selectively and loaded onto carriages 120 and staged for movement onto the main assembly line floor 38. As best seen in FIG. 11, one example of area 30 would include a staging area 220 where multiple bins of parts 224 would be positioned so that workers or robots (not shown) could remove parts from a particular bin and position the part in a selected or predetermined place on carriage 120, for example rack hangers 136, base 140 or part support 150. As explained, in the preferred example, the parts or subassemblies that are loaded onto a carriage 120 would all be parts for the same vehicle or body type, for example body type A. If the predetermined random vehicle build sequence scheduled the next vehicle to be body type B, the next carriage 120 would be loaded with parts suitable for the B body style etc.

At the time of loading a particular carriage 120 with the vehicle appropriate components 139, the carriage 120 would be aligned or sequenced, in area 30, in an order that would match the selected or predetermined order of vehicles that will be built along the assembly lines 40-50 on the assembly plant floor 14 as generally described above. In one example, control checks, for example vision systems 228, could be employed in a verification area 230 to visually ensure or track that the appropriate components have been loaded onto a carriage 120 and/or that the carriages 120 are in the proper order sequence before being released toward the assembly area 38. Other quality control checks or systems, such as bar coding, RFID and other systems known by those skilled in the art can be used.

In one example, movement of components and subassemblies 139 between area 20 and area 30 may be by traditional means, for example fork lift devices (not shown). In other examples, one or more floor-level or elevated conveyors (not shown) may be used to transfer bins, crates or pallets to selected positions in area 30. In staging area 30, carriages 120 are preferably engaged to an overhead conveyor 106 which is used throughout the main assembly area 40 so that no unnecessary transfers to other conveyors or transport systems are necessary providing for seamless loading and transition of the carriages 120 from the sequencing area 30 to the assembly area 40 and back to area 30 to repeat the process. A suitable example of an overhead conveyor 106 to engage and transport carriages 120 is the VersaRoll brand conveyor sold by Comau, Inc. assignee of the present invention. Examples of these programmable and powered overhead transport systems and carriages 120 is described in U.S. Pat. Nos. 6,799,673; 6,564,440 and 6,719,122 which are incorporated herein by reference. Other overhead and floor-based conveyors, automated guided vehicles (AGVs) and transport systems known by those skilled in the art may be used.

Such transport and conveying devices may be controlled by individual or centralized control systems which are preprogrammed to control and monitor the movement of the conveyors 106, carriages 120, robots and other plant equipment associated with the vehicle and/or kit carts connected thereto. Such control systems may be powered and exchange information directly through traditional means such as wire harnesses or may communicate through wireless, cloud-based communication systems and protocols. One example of such wireless or cloud-based system includes U.S. Patent Publication No. US 2010/0241260 assigned to the assignee of the present application and incorporated herein by reference.

Figure 7:
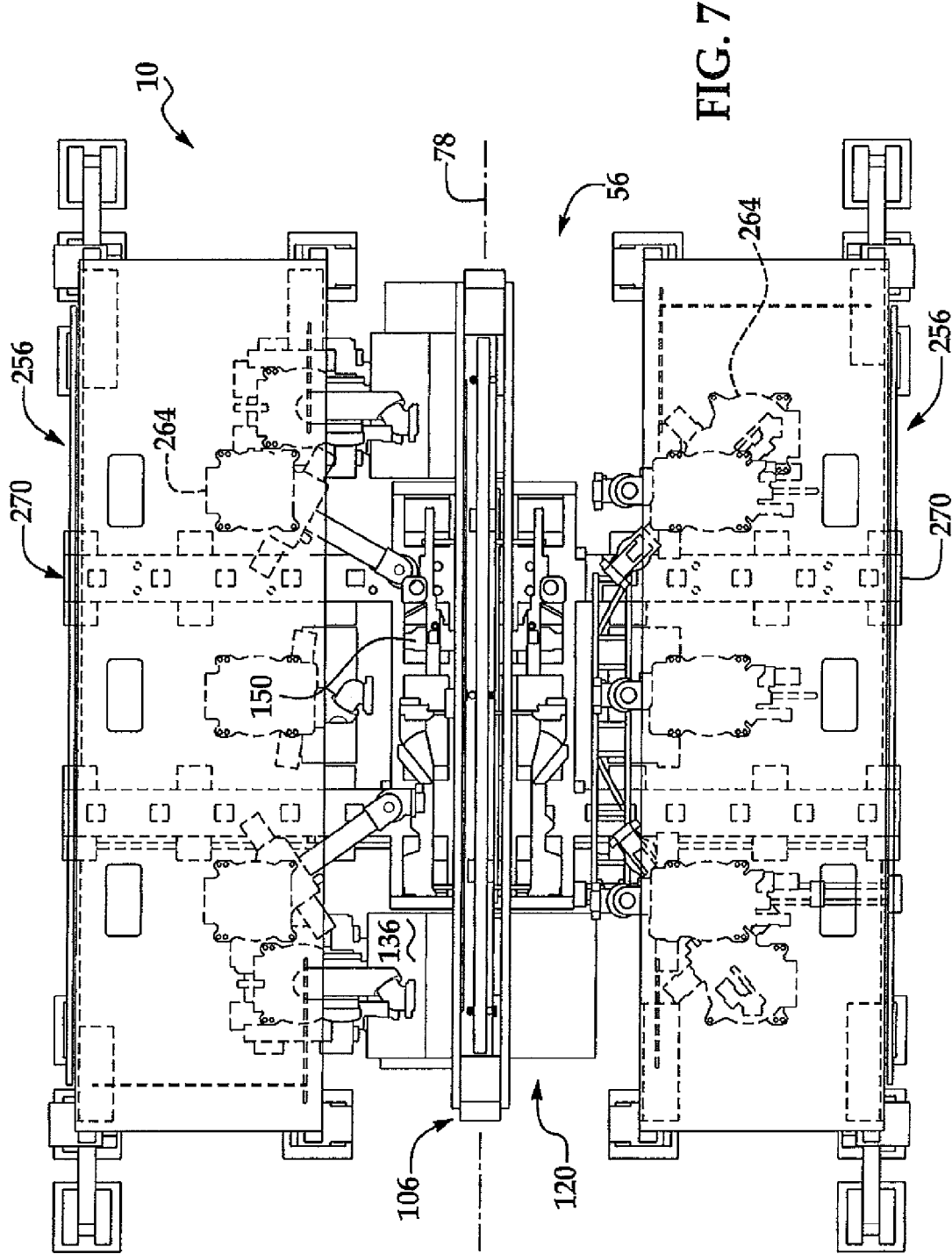
FIG. 7 is a schematic plan view of one example of the invention.

As seen in FIGS. 2, 3 and 7, by having the many individual parts or components and subassemblies 139 stored in areas 20 and 30, and not beside the assembly lines 40-50 as was the case in prior designs, the amount of space and logistical congestion in the main assembly area 38 is greatly reduced. As there is less space needed for the storage of parts adjacent the assembly line, assembly facility aisle widths can be much smaller requiring less floor space in the area of the assembly lines 40-50 and a more efficient facility is achieved over prior art designs. It is estimated that in some configurations, assembly line 38 aisle widths may be up to 50% narrower than prior designs. As explained above, the loaded carriages are positioned on the actual build path 60 of the vehicle body 58 which saves even more plant floor space and reduces logistical congestion.

As generally explained above with reference to FIG. 1, a main assembly area 38 is positioned adjacent to the material sequencing area 30. The individual assembly lines 40-50 are preferably in direct communication so that conveyor 106 can move the loaded carriages 120 from area 30 directly to the selected assembly line for immediate use in the build process. In the example shown, assembly lines 40-50 assemble a vehicle body-in-white consisting of the sheet metal skeleton of an automobile. Other products, parts, devices and machines could be assembled.

Referring to FIGS. 8-11 and 3, an exemplary carriage 120 is illustrated. In the example, carriage 120 is engageable and transportable with an overhead transport system, preferably the VersaRoll system as noted above. In the example, carriage 120 includes a rail 124 which engages rollers on the overhead conveyor 106 (not shown) positioned along the carriage path of travel 78. The preferred conveyor 106 VersaRoll system powers or forcibly moves the carriage 120 along a predetermined path of travel at predetermined and preprogrammed intervals and speeds. Carriage 120 further includes arms 130 which connect part racks 134 to the rail 124. Exemplary part racks 134 include hanger panels 136 which are connected to and suspend bases 140 as generally illustrated. Hanger panels 136 and bases 140 are designed to support individual vehicle body components and subassemblies as loaded in the material sequencing area 30 and along with conveyor transport 106 provide such parts in a ready to install load position in the assembly cell 56 while allowing access by workers or robots in the assembly cells 56 as described below. In a preferred example, racks 134 are designed to be common for all vehicle body types 58 to be assembled in an area of an assembly plant. Alternately, racks 134 may take many different forms and orientations to suit the particular vehicle body and assembly line the carriages may be assigned to. In a preferred example shown in FIGS. 8 and 9, hanger panels 136 include a series of apertures 137 through the panels 136. Apertures 137 provide locating and connection points for fixtures or other supports (not shown) to support the components and subassemblies 139 relative to the panels 136. In a most preferred example, a plurality of apertures 137 are uniformally and precisely spaced in a horizontal and vertical grid pattern to assist in positively locating, positioning and temporarily securing components and subassemblies 139 relative to the respective hanger panels 136 and racks 134.

Each carriage 120 further includes a part support 150 including a deck 156 connected to an elongate bar 160. Deck 156 is used to support the individual components and subassemblies to progressively build vehicle body 58 and is generally positioned between hanger panels 136. Deck 156 preferably includes supports or holding fixtures which position and orient the individual components and subassemblies positioned on the deck 156 in a ready build position in the assembly cell 56. Bar 160 extends below bases 140 and is rigidly connected to deck 156. Bar 160 is selectively engaged to the bases 140 at opposing ends by an actuating engagement mechanism (not shown) as best seen in FIG. 10.

Figure 10:
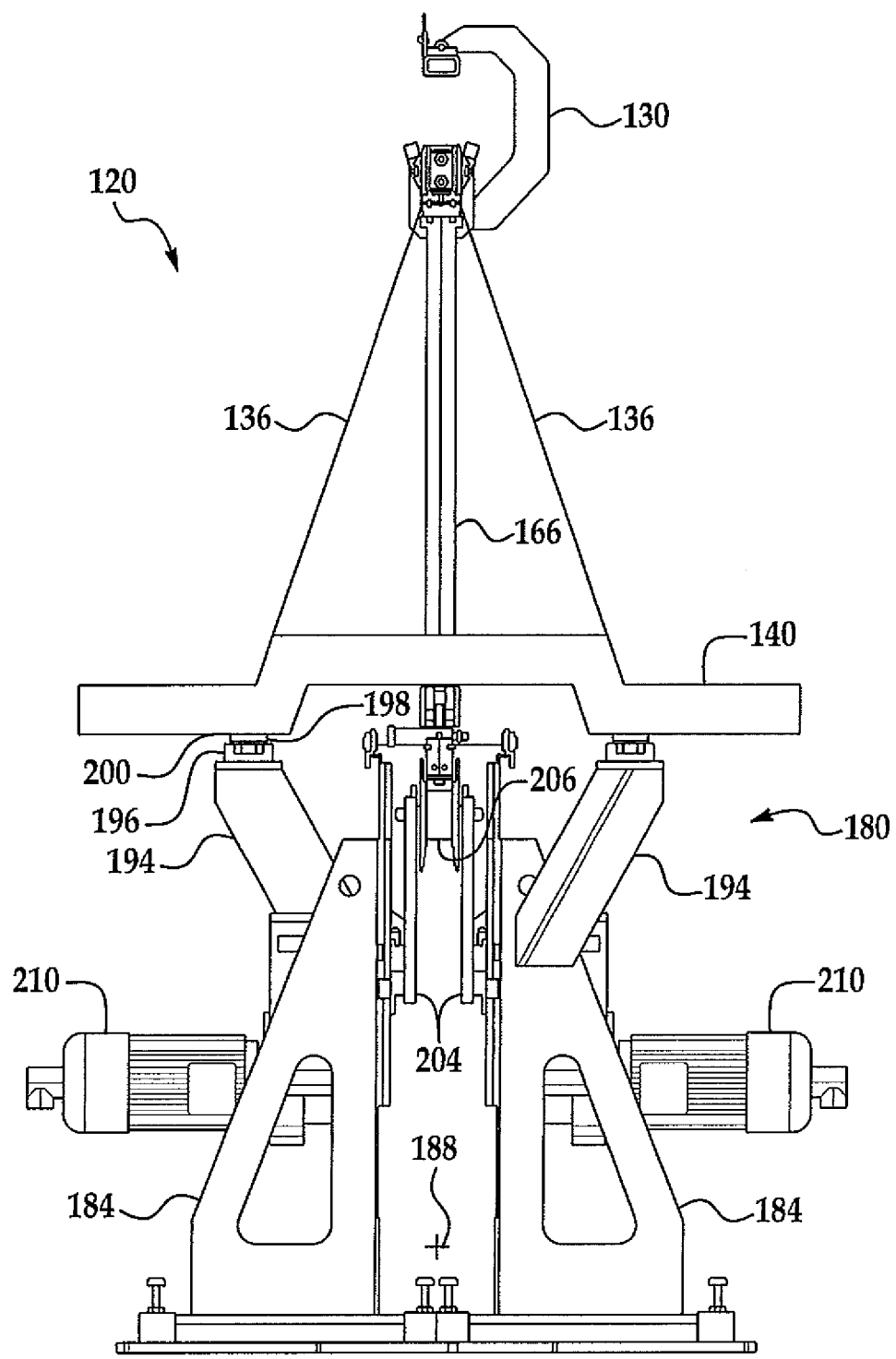
FIG. 10 is a schematic end elevational view of the example shown in FIG. 9.

In the example as best seen in FIG. 10, two telescopic guide posts 166 are connected to the part support 150, each post 166 extends upwardly through the hanger panels 136 and rigidly connected to the rail 124. With the combination of the individual carriers 120 on conveyor 106, the hanger panels 136 providing preloaded parts in the assembly cell ready to be installed, and deck 156 positioning the build assembly or vehicle body 58 in a build position in the cell, the invention provides a highly efficient, integrated part delivery and build system while eliminating peripheral part and transport logistics problems in prior systems. Although the hanger panels 136 are shown as opposing panels angularly positioned from one another, it is understood that hanger panels 136 and part racks 134 can take other forms and orientations suitable for the components to be assembled and the build process as known by those skilled in the art. It is further understood that other devices and mechanisms for allowing deck or part support 150 to move relative to the part racks known by those skilled in the art may be used.

Figure 8:
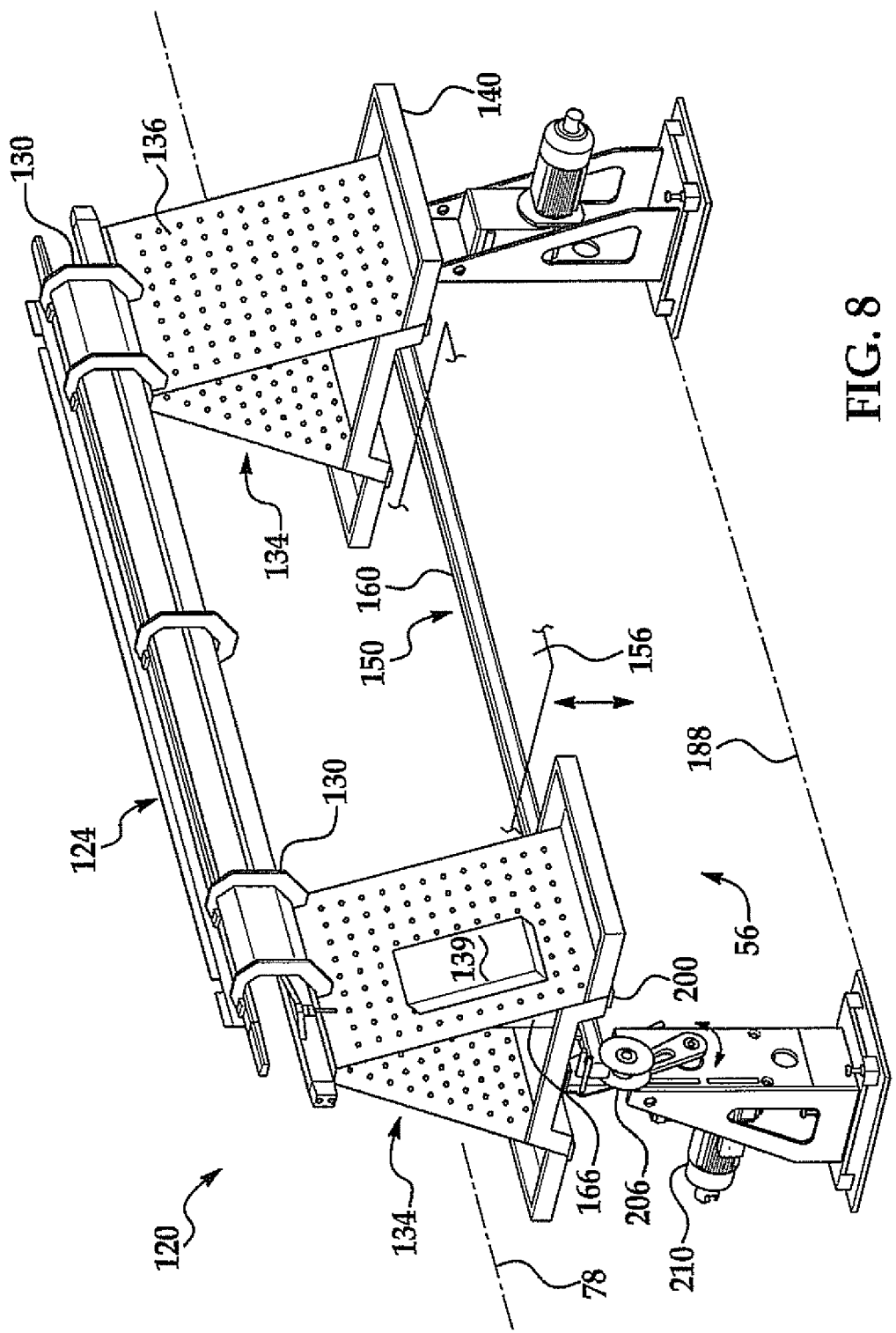
FIG. 8 is partial perspective view of an example of a vehicle build carriage useful with other aspects of the invention.
Figure 9:
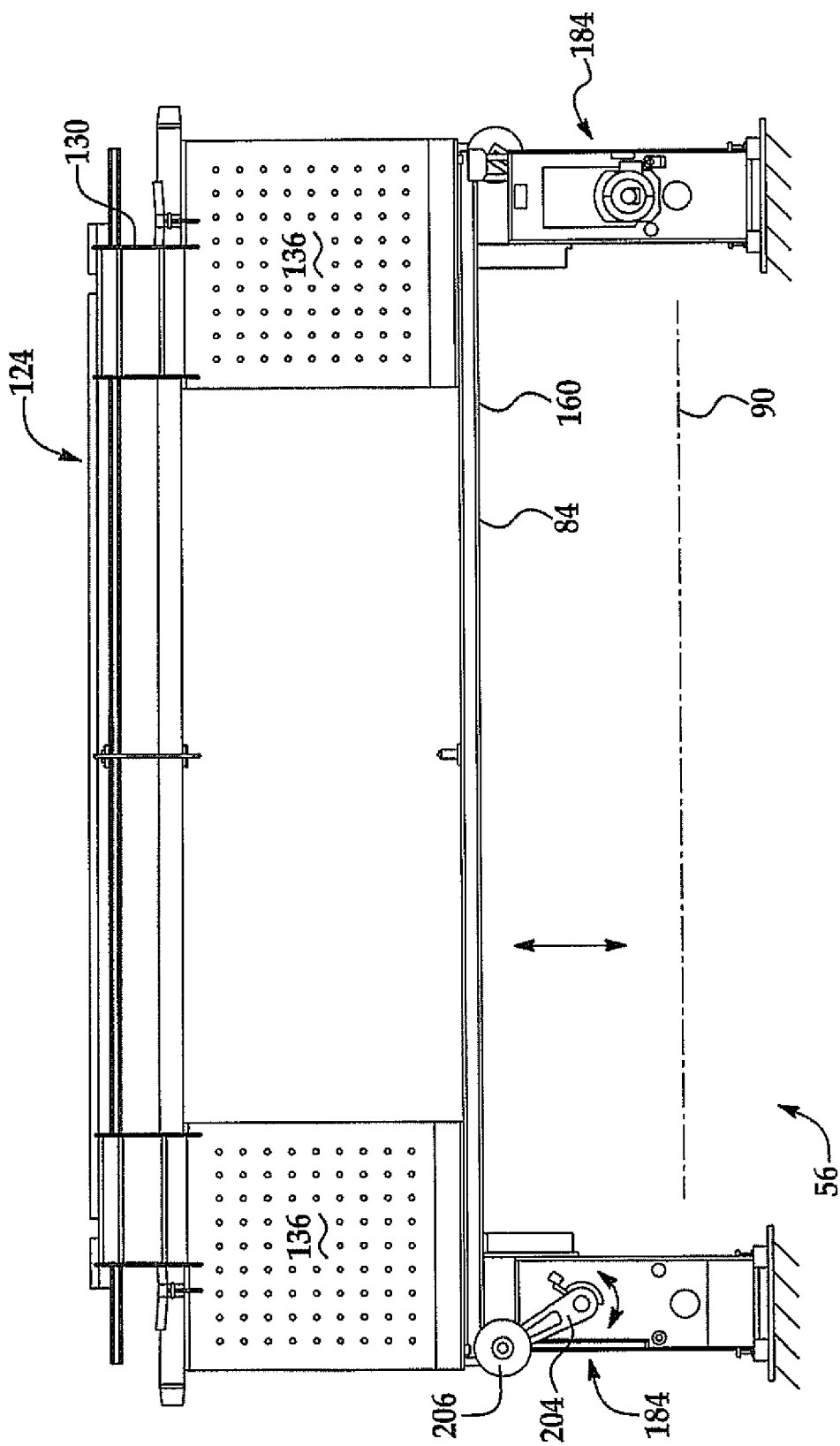
FIG. 9 is a schematic side elevational view of the example shown in FIG. 9.

Referring to FIGS. 8-10 and 4, in the exemplary invention 10, each assembly cell 56 includes a pair of deck lifts 180 mounted to the assembly plant floor. Deck lift 180 includes a pair of upstanding pillars 184 that are symmetrically positioned about a centerline 188 which is generally in alignment with carriage path 78 and vehicle path 60. Each pillar 184 includes a rigid support arm 194 angularly extending from the pillar and including a guide block 196 defining a channel 198. The guide block 196 and channel 198 coordinate with a guide rail or form 200 positioned along the underside of bases 140 as best seen in FIGS. 8 and 10. The guide blocks 196 and channels 198 serve to accurately and precisely guide and position the carriage in the assembly cell. Sensors and controllers (not shown) to monitor the positional location of the carriage along the path of travel 78 and most importantly in the assembly cell, may be used. A suitable example of a highly accurate positional system useful with conveyors and transports is marketed under the brand VersaCoder by Comau, Inc. assignee of the present invention and is disclosed in U.S. Pat. No. 7,108,189 the entire contents of which is incorporated herein by reference.

Each deck lift pillar 184 further includes a rotatable lift arm 204 and a support wheel 206 electrically connected to a motor 210 which selectively rotates arm 204. Wheel 206 engageably receives a portion of bar 160 of the part support 150 of the carriage when carriage 120 is positioned in an assembly cell 56 as best seen in FIGS. 5 and 11.

Figure 5:
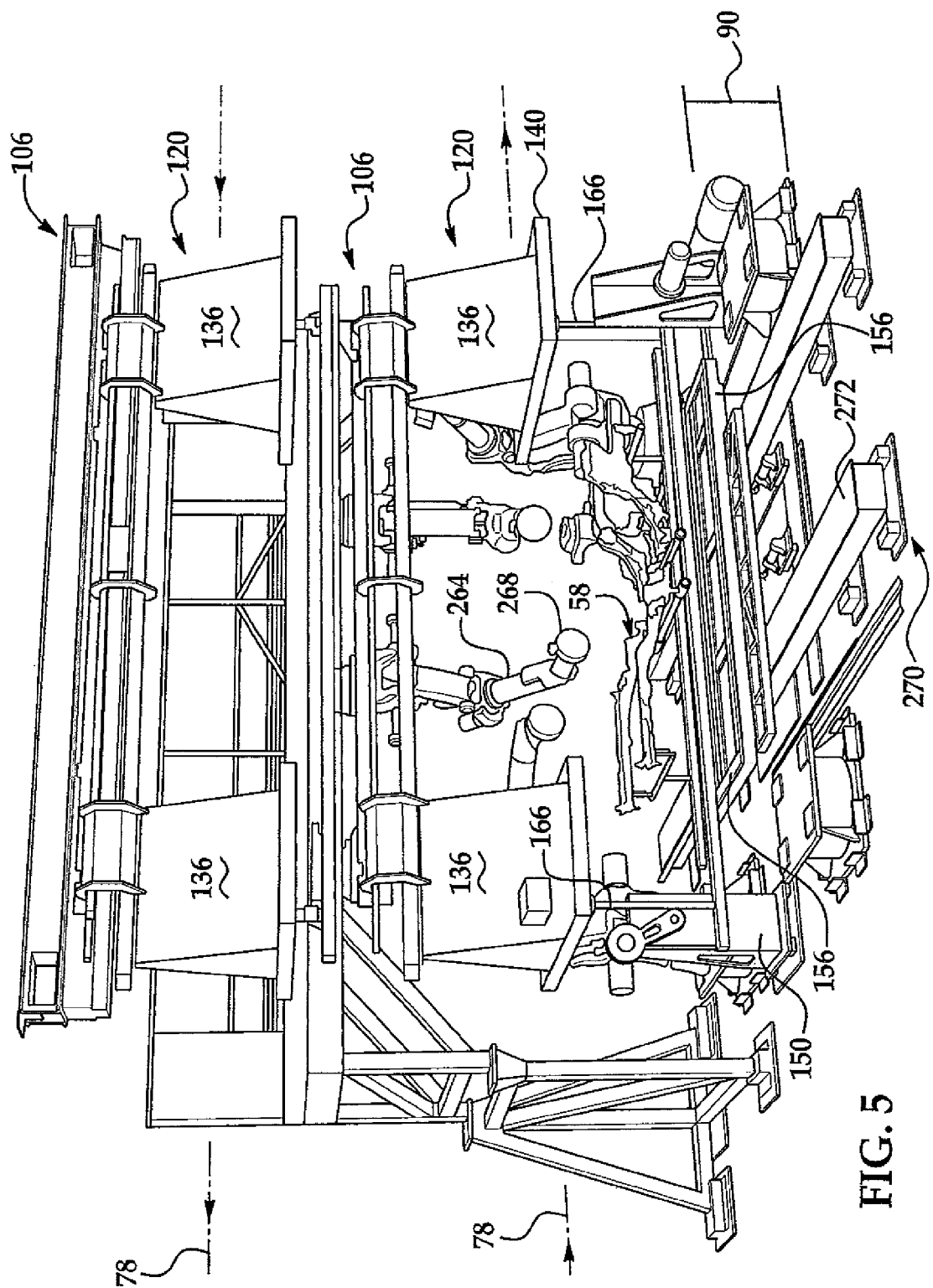
FIG. 5 is an schematic perspective view of the example shown in FIG. 4 with the vehicle build carriage in a build position.

As also seen in FIGS. 4 and 5, each assembly cell preferably includes a conveyor 270 positioned transverse to the carriage path 78 and vehicle path 60 as generally shown. Conveyor 270 includes tracks 272 which support and guide tooling on a pallet 274 and is selectively positioned in cell 56 beneath the carriage 120 and between deck lift pillars 184. The tooling may include fixtures, clamps and other devices to coordinate with the vehicle-specific body 58 that is positioned in the assembly cell for processing. Conveyor 270 is useful so that different pallets 274 and associated vehicle tooling connected thereto can quickly be moved in and out of assembly cell 56 to support the predetermined random build vehicle sequence. Suitable powered floor-mounted conveyor devices for moving pallets are marketed by Comau, Inc. and described in U.S. Pat. Nos. 6,564,440 and 6,966,427 the entire contents of which are incorporated herein by reference. Other conveyor devices and tooling change devices known by those skilled in the art may be used.

Figure 6:
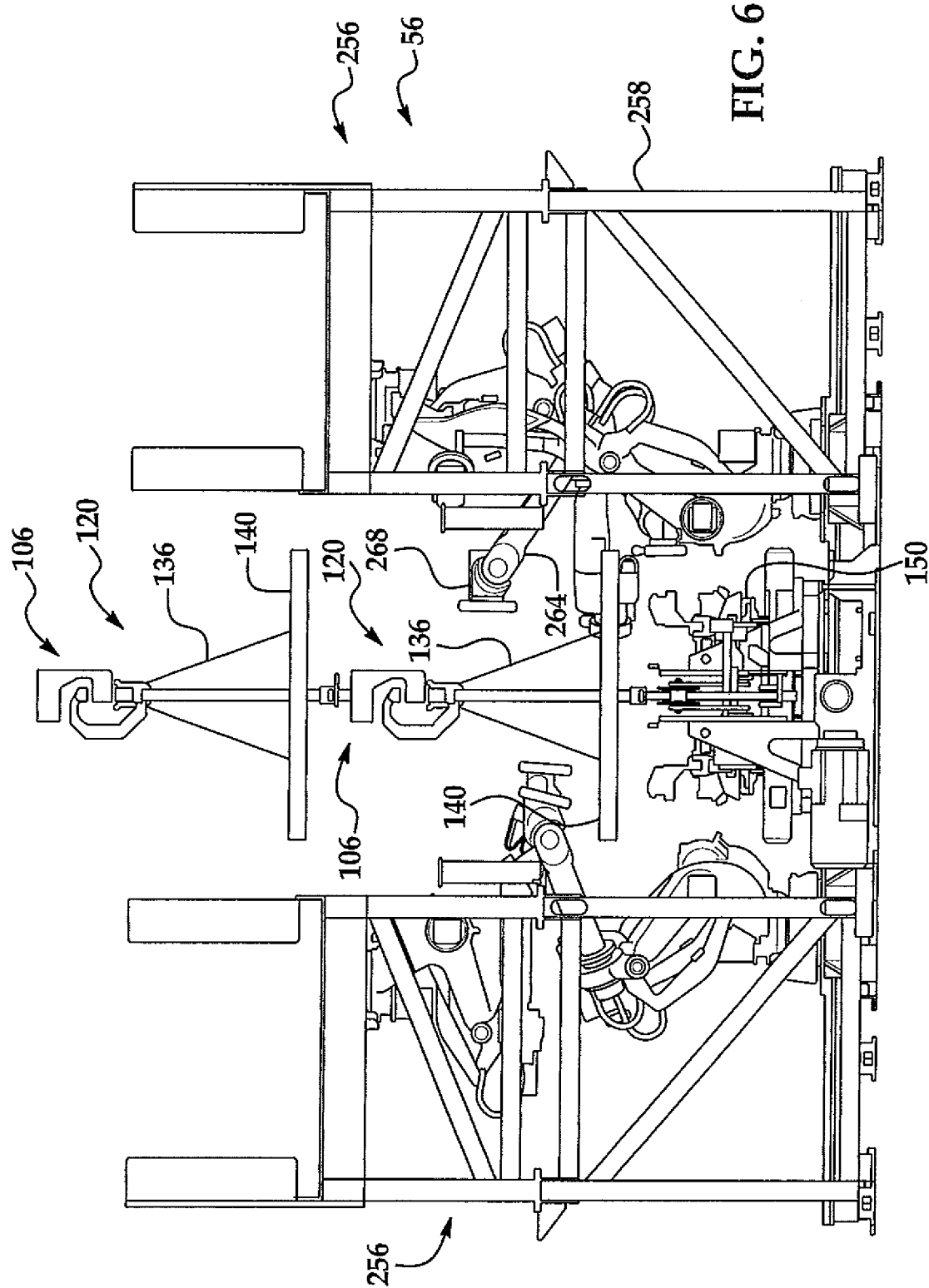
FIG. 6 is a schematic end elevational view of an example of the invention in an assembly cell.

As best seen in FIGS. 4-6, an example of assembly cell 56 preferably includes an assembly structure or scaffold 256 positioned on each side of the assembly line vehicle body path 60 and carriage path 78. Each structure 256 includes a frame 258 supporting and housing a plurality of industrial, multi-axis robots 264 for use in the assembly operations to be conducted in the cell. In the example shown, some robots 264 are suspended from the frame 258 further reducing congestion on the assembly plant floor. In the example, an upper platform above the frame supports the necessary electronics and programmable controls to operate the robot and other electrically powered devices for a substantially self-contained and modular cell. Industrial robots 264 are used to pick up and position parts off of the carriage 120 may include interchangeable end effectors 268 which weld, glue, include fixtures to hold or position parts or otherwise connect the parts together suitable for the assembly operations in the cell. A suitable example of an assembly cell structure is disclosed in U.S. patent application Ser. No. 12/262,722 assigned to assignee of the present invention. An example of changeable end effectors on an industrial robot is described in U.S. Patent Application Publication No. 2010/0180711 assigned to the Assignee and is incorporated herein by reference. Other assembly cell structures known by those skilled in the art may be used.

As best seen in the example 10 shown in FIGS. 4 and 5, when a loaded carriage 120 enters assembly cell 56 by conveyor 106, the carriage 120 is positioned at a second or cell load height 84 which is preferably higher than the first or load height that the carriage is in when being loaded in area 30. In the assembly cell 56, the carriage base guides 200 slidingly engage the guide blocks 196 on the deck lift pillars 184 positively locating the carriage 120 with respect to the assembly cell. The final position of the carriage 120 in the cell would be determined by controllers and sensors (not shown) in communication with the conveyor 106.

In this position, the deck 156 and connected bar 160 are selectively disengaged from the bases 140 by a mechanism in communication with the system controller and previously mentioned sensors (not shown, but example provided above)

thereby allowing relative vertical movement between the deck 156 supporting the progressively built vehicle body 58 and the remaining portion of carriage 120 which remain suspended by the conveyor 106 and supported by the deck lift 180. The deck lift motors 210 are selectively actuated allowing the deck 156 to lower from the second cell load height 84 down to a third and lower build height 90 as best seen in FIG. 5. The deck 156 remains connected to the carriage 120 through guide posts 166 which telescopically extend as the deck 156 is lowered. As best seen in FIG. 5, in this position, the space between the bases 140 is open allowing a wide range of movement of robots 264 to articulate and carryout the predetermined build operations at the assembly cell.

In this position, the robots can access and engage additional parts and subassemblies that are stored on the carriage hanger panels 136 and bases 140 and accurately move them into position on the progressively built body 58 which is positioned on a tooling pallet 274 that has been moved into position along conveyor 270. The tooling pallet 274 may include fixtures, clamps and other devices to engage and position vehicle body 58 as generally described above.

On completion of the predetermined operations in the assembly cell, the deck lift motors 210 are selectively actuated to raise the now more complete vehicle body 58 positioned on deck 156 back to the cell load height 84 where the deck and bar 160 are re-engaged with the bases to lock the deck to the bases 140 and remaining portions of the carriage 120.

When all operations in assembly cell 56 are complete, the conveyor 106 is actuated and carriage 120 is moved along path 78 out of the assembly cell. When sufficient uninstalled parts remain on the carriage to support further assembly operations at sequential build stations, carriage 120 continues along path 78 to the next sequential assembly cell.

As best seen in FIG. 3, if assembly cell 56 is the last cell in a particular assembly line, or the parts to be installed on carriage 120 have been depleted, carriage 120 is moved from the assembly cell 56 and is raised along path 78a by an elevator device (not shown) to the return height 96 wherein the carriage is engaged with another conveyor, for example another conveyor 106, for return to area 30 for reloading as generally described above. In a preferred example, conveyor 106 along elevated path 78a is simply an upper portion of the VersaRoll transport system positioned and generally oriented as illustrated.

Figure 12:
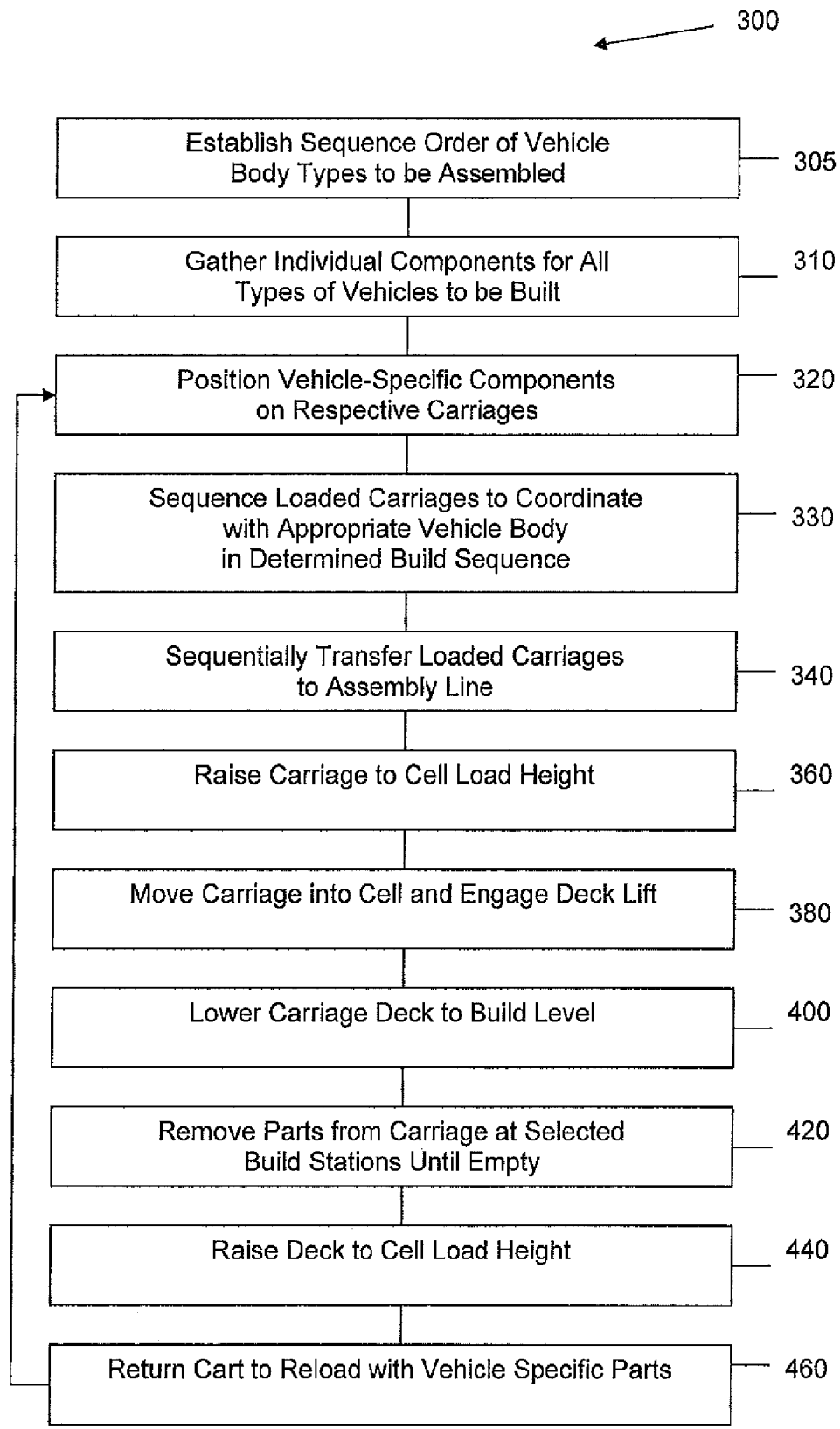
FIG. 12 is a schematic flow chart of an exemplary process of the invention.

Referring to FIG. 12, an example of the process or method of operation of the integrated vehicle part delivery system 300 is schematically shown.

In step 305, a manufacturing and assembly plant predetermines the order that machines, for example, automobile sheet metal bodies, are to be built for a work shift or day. In step 310, the appropriate individual components or subassemblies are gathered, organized and stored in a material entry area 20 as generally described above. Although shown in FIG. 1 with an assembly line area 40 only to one side of areas 20 and 30, it is understood that areas 20 and 30 could be positioned between separate banks or arrays of main assembly line areas 38 on plant floor 14. It is further understood that these areas, individually, can be at different locations with respect to each other and the assembly line area 38 or particular lines 40-50. For example, area 20 could be used for entry of subassemblies from an adjacent main assembly line (not shown) instead of individual components. These subassemblies could then be transferred to an area 30 and then to other main assembly lines 40-50 as shown and described in FIG. 1.

In step 320, the appropriate components and/or subassemblies are transferred to a sequencing area 30. The carriages 120 are preferably engaged to conveyor 106 and positioned at loading height 80 as generally shown in FIGS. 2 and 3 (area 30) are selectively loaded with vehicle body-specific parts or subassemblies to coordinate or match the predetermined vehicle build sequence in step 305. In step 330, the loaded carriages 120 are placed in order or are staged in area 30 as best seen in FIG. 11 before being transferred out onto the main assembly line floor 38.

In step 340, the loaded carriages 120 are transferred along path 78 by conveyor 106 from area 30 onto the main assembly area 38 preferably directly aligned with vehicle path 60.

In a preferred, but exemplary step 360, prior to entering assembly cell 56, carriage 120 is raised to a cell load height 84 by an elevator device 110.

In step 380 the carriage is moved into the cell 56 and engages deck lift 180 to positively locate the carriage. The carriage deck bar 160 is unlocked or disengaged from the bases 140 allowing for relative vertical movement.

In step 400, the deck lift is actuated to lower down the deck into a build height position 90 and the body parts or partially assembled vehicle body 58 is placed in operable engagement with a tooling pallet 274 best seen in FIG. 4, to assist in the continued assembly process of the body 58. The guide posts 166 telescopically extend and provide some locational support for the deck as it is lowered.

In step 420, robots 264 or other assembly cell equipment remove additional build components stored on the carriage 120 rack hanger panels 136 positioned in the assembly cell and carryout the predetermined build operations assigned to that cell.

On completion of the build operations in a particular cell or line, in step 440, deck lift 180 is engaged to return the deck 156 to the higher cell load height 84 wherein the deck 156 is re-engaged and locked to the carriage 120.

In step 460 the carriage is moved out of the assembly cell and proceeds by conveyor 106 to the next assembly cell along path 78. When a particular assembly line's operations are complete, for example at the end of assembly line 40 in FIG. 1, the completed vehicle body (or portion thereof) is transferred off of the carriage 120 by a lift or other transfer device (not shown) and the empty carriage is raised by an elevator (not shown) along path 78a to a high return height 96 for travel back to sequence area 30 for reloading and resequencing.

As best seen in FIG. 2, in an alternate step (not shown in FIG. 12), the carriage 120 is slightly lowered at a predetermined portion of the return path 78a to accommodate build operations and efficiency of space. This exemplary process is repeatable for each assembly line 40-50 shown in FIG. 1.

Although the path 78 of the loaded carriages 120 is from left to right in the examples discussed in FIG. 1, an alternate exemplary path is shown in FIG. 1 for line 46. In this example, assembly line 46 is a progression of vehicle bodies 58 which move and are assembled through cells 56 right to left toward material sequencing area 30. In this example, loaded carriages may be initially raised in the sequencing area or before the line 46 to the previously discussed return heights 96 and/or 100 for travel to the far end of line 46 (away from area 30) and lowered by an elevator device (not shown) along path 78a downward and inserted into path 78 and cell 56 to progress the build along line 50 in a direction right to left in FIG. 1 toward area 30.

Figure 13:
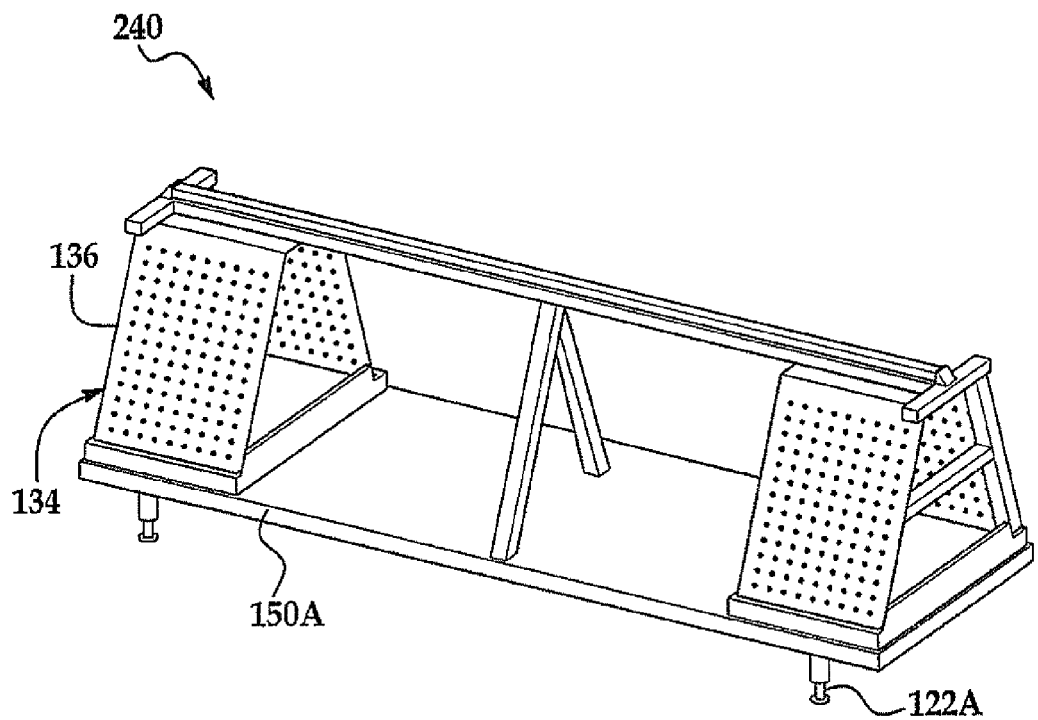
FIG. 13 is a schematic perspective view of one example of a part kit cart 240.
Figure 14:
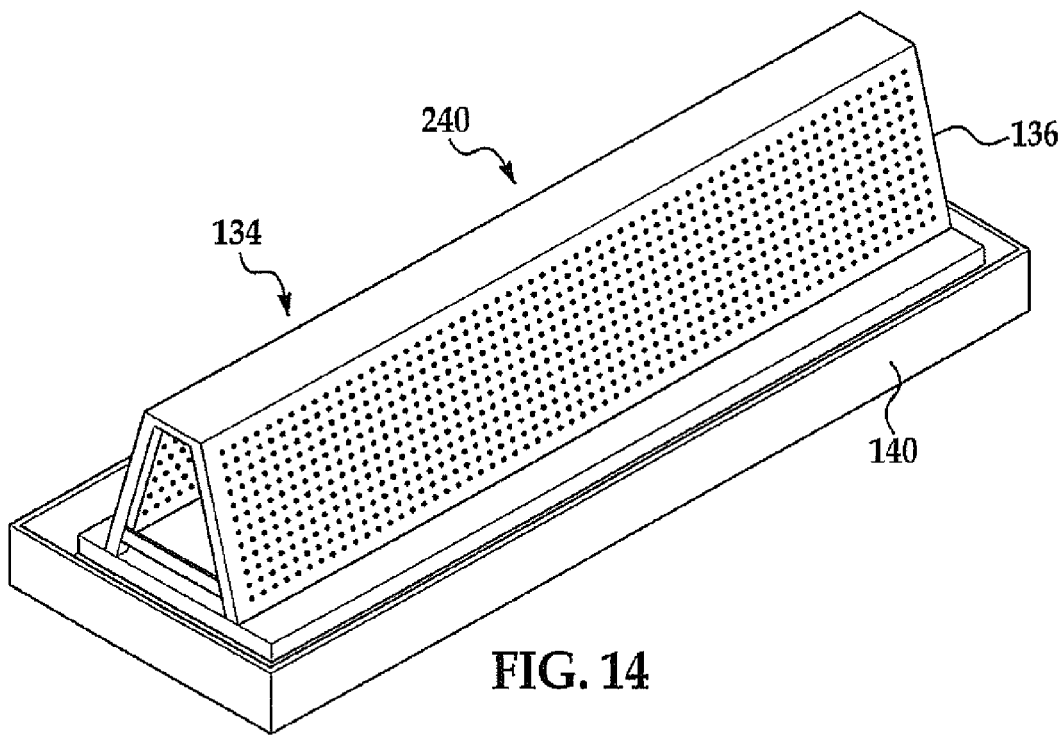
FIG. 14 is a schematic perspective view of an alternate part kit cart 240 shown in FIG. 13

In an alternate example shown in FIG. 1 between lines 48 and 50, independent part kit carts 240 which may be similar to racks 134 including hanger panels 136 and apertures 137 as described, but rollable pallets powered by floor conveyors or other power means, may be used to supply selected or additional parts which may not be suitable for use on carriages 120 in the manner described. Such kit carts would be sequenced and travel along a path adjacent the assembly line and accessible by robots to remove parts from the carts and install them in the assembly cell as generally described. Referring to FIGS. 13 and 14, examples of such kit carts 240 and method of use are described in U.S. Pat. No. 8,869,370 assigned to assignee of the present invention the entire contents of which is incorporated by reference. As described in one of the examples in U.S. Pat. No. 8,869,370, the carts 240 with racks 134 may be stationary with fixed legs or stands 122A.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A method for providing coordinated component delivery for use in a predetermined random build sequence in vehicle manufacturing assembly lines, the method comprising the steps of:
   gathering a plurality of individual vehicle build components for at least a first and a second vehicle type, the first vehicle type different than the second vehicle type;
   loading selected of the vehicle build components for one of the first vehicle type on one of a plurality of first movable carriages;
   loading selected of the vehicle build components for one of the second vehicle type on another one of the plurality of first carriages;
   sequencing each of the plurality of first carriages loaded with respective of the first vehicle or the second vehicle type vehicle build components in sequential order such that the respective loaded first carriages coordinate with a predetermined sequence of the at least first and second vehicle types to be assembled;
   supporting the first or second vehicle type to be progressively assembled with the respective first carriage supporting the loaded vehicle build components for the respective first or second vehicle type;
   progressively moving each first carriage loaded with respective of the first vehicle or second vehicle type vehicle build components along a path of the vehicle build; and
   progressively removing selected of the vehicle build components from the respective first carriages at a plurality of build stations along the assembly line to progressively assemble at least a portion of the respective first and second vehicle types.

2. The method of claim 1 wherein the step of loading selected vehicle build components on one of the plurality of first carriages further comprises the step of individually positioning the vehicle build components on at least one rack hanger integrated with the respective first carriage.

3. The method of claim 2 wherein the step of positioning of the vehicle build components on the at least one rack hanger further comprises the step of removably securing the positioned vehicle build components on a hanger panel positioned on the rack hanger.

4. The method of claim 3 wherein the step of removably securing of the vehicle build components on the hanger panel further comprises the step of removably securing the respective vehicle build components in respective predetermined three dimensional positions on the hanger panel operative for respective engagement by a programmable assembly robot.

5. The method of claim 4 wherein the step of removably securing the vehicle build components on the hanger panel further comprises engaging selected of a plurality of substantially equally spaced apertures in the hanger panel, the spaced apertures operable to accurately dimensionally position the vehicle build components in the predetermined three dimensional position on the first movable carriage.

6. The method of claim 1 further comprises the steps of:
   loading selected of the vehicle build components for the first vehicle or the second vehicle type on hanger panels positioned on second movable carriages;
   sequencing each of the second carriages loaded with respective of the first vehicle or the second vehicle type vehicle build components in sequential order to coordinate with the predetermined sequence of the at least first and second vehicle types to be assembled;
   moving the respective second carriages along a path adjacent the vehicle build path coordinated with the predetermined sequence of the at least first and second vehicle type to be assembled; and
   selectively removing the vehicle build components from the second carriage hanger panels; and
   connecting the selectively removed vehicle build components to the partially assembled first or second vehicle type supported by the first carriage.

7. The method of claim 1 wherein the step of loading selected vehicle build components on one of the plurality of first carriages further comprises the step of loading the vehicle build components in a material sequencing area positioned distant from, but in communication with the manufacturing assembly line including the build stations.

8. The method of claim 1 further comprising the step of returning the first carriage to an area to be reloaded with the vehicle build components.

9. The method of claim 1 further comprising the step of engaging the first carriage with an overhead conveyor for moving the first carriage, the loaded vehicle build components and the supported first or second vehicle type along the vehicle build path as a single first carriage unit.

10. A method for providing coordinated component delivery for use in a predetermined random build sequence in vehicle manufacturing assembly lines, the method comprising the steps of:
    gathering a plurality of individual vehicle build components for at least a first and a second vehicle type, the first vehicle type different than the second vehicle type;
    loading selected of the vehicle build components for one of the first vehicle type on one of a plurality of movable carriages;
    loading selected of the vehicle build components for one of the second vehicle type on another one of the plurality of carriages;
    sequencing each of the plurality of carriages in sequential order such that the respective carriages loaded vehicle build components coordinate with a predetermined sequence of the at least first and second vehicle types to be assembled;

loading a partially completed first or second vehicle type on a deck portion of the carriage, the deck portion positioned adjacent to at least one rack hanger and moveable relative to the rack hanger;

supporting the first or second vehicle type to be progressively assembled with the respective carriage supporting the loaded vehicle build components for the respective first or second vehicle type;

progressively moving each carriage loaded with the respective vehicle build components along a path of the vehicle build; and progressively removing selected of the vehicle build components from the respective carriages at a plurality of build stations along the assembly line to progressively assemble at least a portion of the respective first and second vehicle types.

11. The method of claim 10 further comprising the step of reciprocally moving the carriage deck portion relative to the rack hanger to position the respective partially completed first or second vehicle type in a build position in a respective build station.

12. The method of claim 11 wherein the step of moving the first carriage deck portion further comprises the steps of:
   operably disengaging the deck portion from the rack hanger;
   lowering the deck portion to the build position; and
   raising the deck portion for re-engagement to the rack hanger following completion of assembly operations at the build station.

13. The method of claim 12 wherein the deck portion remains connected to the rack hanger and is telescopically and movably guided relative to the rack hanger to and from the build position.

14. The method of claim 11 further comprising the step of transferring a tooling pallet into the build station to precisely position the partially assembled first or second vehicle type in the build station for assembly.

* * * * *